United States Patent
Xu et al.

(10) Patent No.: US 10,735,504 B2
(45) Date of Patent: Aug. 4, 2020

(54) SYSTEM AND METHOD FOR DISTRIBUTED WORKBOOK STORAGE

(71) Applicant: ORACLE INTERNATIONAL CORPORATION, Redwood Shores, CA (US)

(72) Inventors: Jianwu Xu, Alpharetta, GA (US); Philip G. Holland, Cambridge, MA (US); Dengsheng Huang, Marietta, GA (US); Anoop Mohan, Cumming, GA (US); Eric J. Bloemeke, Alpharetta, GA (US); Harsh Malhotra, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1190 days.

(21) Appl. No.: 14/988,953

(22) Filed: Jan. 6, 2016

(65) Prior Publication Data

US 2017/0193535 A1 Jul. 6, 2017

(51) Int. Cl.
*H04L 29/08* (2006.01)
*G06Q 30/02* (2012.01)
(Continued)

(52) U.S. Cl.
CPC ..... *H04L 67/1017* (2013.01); *G06Q 30/0202* (2013.01); *G06F 9/5083* (2013.01); *G06F 16/134* (2019.01); *G06F 16/1827* (2019.01)

(58) Field of Classification Search
CPC .. G06F 16/1827; G06F 16/134; G06F 9/5083; H04L 67/1017; G06Q 30/0202
See application file for complete search history.

(56) References Cited

U.S. PATENT DOCUMENTS 7,251,776 B2 7/2007 Handsaker et al.
7,284,011 B1 * 10/2007 Narayanaswamy .. G06F 16/283
707/700

(Continued)

OTHER PUBLICATIONS

Alan Eldridge, Best Practices for Designing Efficient Tableau Workbooks, Jul. 12, 2015, Tableau, all pages. (Year: 2015).*

*Primary Examiner* — Irete F Ehichioya
*Assistant Examiner* — Antonio J Caiado
(74) *Attorney, Agent, or Firm* — Kraguljac Law Group, LLC (57) ABSTRACT

Systems, methods, and other embodiments are disclosed that are configured to provide distributed workbook storage for a multi-dimensional database system. In one embodiment, a workbook is created where the workbook is a personal data repository which is a subset of a domain of persistent multi-dimensional data cache of the multi-dimensional database system. A distributed storage location is selected for the workbook from multiple distributed storage locations of the data cache. A round robin selection process is used that promotes balanced loading and usage of multiple workbooks stored across the multiple distributed storage locations. A workbook directory structure is created for the workbook within the selected distributed storage location. The workbook directory structure reflects a same directory structure provided by a common global domain of the multi-dimensional database system up to a root directory of the selected distributed storage location.

18 Claims, 5 Drawing Sheets

(51) Int. Cl.
    *G06F 9/50*          (2006.01)
    *G06F 16/13*        (2019.01)
    *G06F 16/182*      (2019.01)

(56)             References Cited

U.S. PATENT DOCUMENTS

| | | |
|---|---|---|
| 7,991,804 B2 | 8/2011 | Battagin et al. |
| 8,578,399 B2 | 11/2013 | Khen et al. |
| 9,218,386 B2 | 12/2015 | Xu et al. |
| 9,317,495 B2 | 4/2016 | Khen et al. |
| 9,342,497 B1 * | 5/2016 | Waite .................... G06F 17/246 |
| 2002/0010743 A1 * | 1/2002 | Ryan .................... G06F 17/246 |
| | | 709/205 |
| 2003/0110191 A1 * | 6/2003 | Handsaker ............ G06F 17/246 |
| | | 715/212 |
| 2004/0039891 A1 * | 2/2004 | Leung .................... G06F 16/10 |
| | | 711/165 |
| 2004/0133652 A1 * | 7/2004 | Miloushev .......... G06F 11/1076 |
| | | 709/214 |
| 2005/0149481 A1 * | 7/2005 | Hesselink ........... H04L 63/0209 |
| 2006/0085594 A1 * | 4/2006 | Roberson ............ G06F 11/1076 |
| | | 711/114 |
| 2006/0161577 A1 * | 7/2006 | Kulkarni ............. H04L 67/1008 |
| 2013/0013993 A1 * | 1/2013 | Oh ....................... G06F 17/5009 |
| | | 715/212 |
| 2013/0018861 A1 * | 1/2013 | Xu ....................... G06F 16/2308 |
| | | 707/704 |
| 2013/0111576 A1 * | 5/2013 | Devine ............... G06F 11/0709 |
| | | 726/11 |
| 2015/0379585 A1 * | 12/2015 | Hendricks .......... G06Q 30/0276 |
| | | 705/14.72 |

\* cited by examiner

SYSTEM AND METHOD FOR DISTRIBUTED WORKBOOK STORAGE

BACKGROUND

In the world of retail business, the ability for a retail organization to integrate and manipulate planning and forecasting data is very important. One way to accomplish this is to provide an integrated hardware and software solution (e.g., a database system) that allows users to access and generate retail data in a workbook format. For example, a workbook may be a local copy of the data of record in a domain that the end user can view and manipulate. A workbook can exist in a framework which is used to perform specific business functions such as, for example, generating sales forecasts and building merchandise financial plans. A workbook can contain data presented in the form of any number of multidimensional spreadsheets, called worksheets, as well as graphical charts and related reports.

In prior systems, a retail database system (e.g., a retail database software application residing on a server computer) stored information in a persistent multidimensional data cache that was optimized for large volumes and dimensional or time series data access requirements typically required by multidimensional solutions. Such a persistent multidimensional data cache acted as a central repository and was known as a domain. The domain included central definitions of metadata for the solution and provided a single update point. A user could interact with a solution through a personal data repository (i.e., a workbook) which contained a subset of the data (and metadata) from the domain. The scope of the workbook was constrained by the access rights available to the user.

Workbooks can also be characterized as domain subsets using ranged hierarchies based on user selections. In prior systems, workbooks were stored in each domain's directories, under the workbook owner's user directory. The workbook storage location was assumed to be one level below the domain's user directory. However, in many customer domains, workbook data can constitute a large percentage of the total domain size. Multiple operations referencing a user's directory can lead to contentions or cause disk out-of-space issues.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Computerized systems, computerized methods, and other computerized embodiments are disclosed that provide for the intelligent distributed storage of electronic workbooks among computerized file system mount points, including extra computerized mount points that are provided outside of a domain's root directory. Multiple extra computerized mount points may be provided that represent extra electronic storage locations that are plugged into a computerized retail database system. Distributed workbook storage is an efficient and flexible way to maintain performance of workbook operations while providing extra flexibility and electronic storage. With electronic workbooks distributed across multiple computerized file system mount points, the performance of workbook operations is improved since fewer contentions are encountered for computerized file operations.

In accordance with one embodiment, a computerized intelligent distribution algorithm uses a round-robin method to distribute electronic workbooks evenly across the multiple computerized file system mount points such that usage and load of each computerized storage location is balanced. Additional electronic storage locations can be added and stored electronic data can be moved to accommodate additional electronic workbooks and provide enhanced workbook operations performance. Distributing the electronic storage space across different computerized file system mount points avoids problems that can be created when multiple users try to access the same computer disk, resulting in increased load on the machine that slows down performance.

The following terms are used herein with respect to various embodiments.

The terms "mount point", "file system mount point", and "distributed storage location" may be used interchangeably herein and refer to computerized and electronic embodiments.

The term workbook, as used herein, refers to an electronic local copy of the data of record in a computerized domain that an end user can view and manipulate. In other words, a workbook is a personal repository which is a subset of a domain of persistent multi-dimensional data cache (e.g., multi-dimensional data structures) of a multi-dimensional database system. A workbook exists in a computerized multidimensional framework which is used to perform specific business functions such as, for example, generating sales forecasts and building merchandise financial plans. A workbook can contain data presented in the form of any number of multidimensional spreadsheets, called worksheets, as well as graphical charts and related reports.

Figure 1:
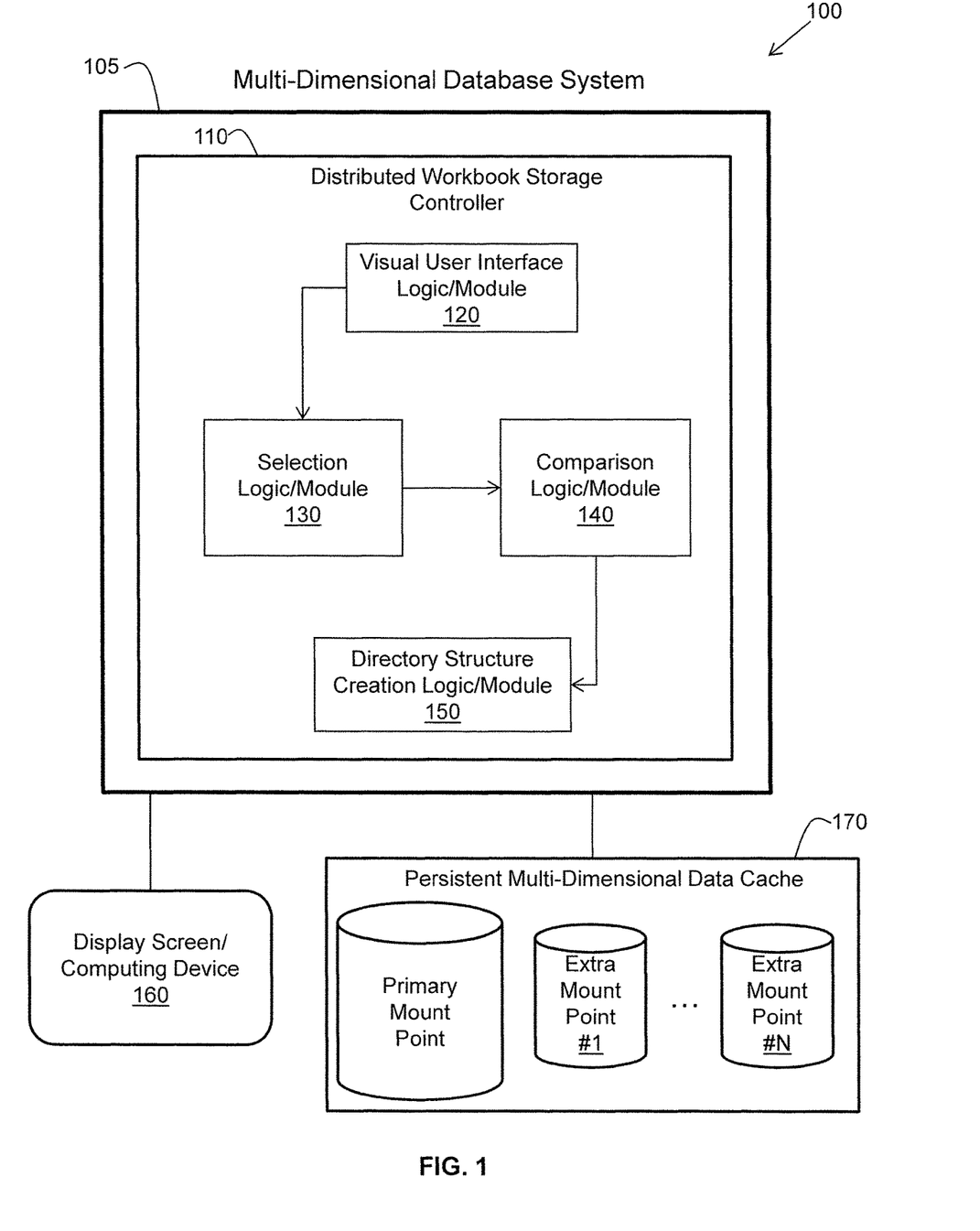
FIG. 1 illustrates one embodiment of a multi-dimensional database system, having a computing device configured with a distributed workbook storage controller.

FIG. 1 illustrates one embodiment of a multi-dimensional database system 100, having a computing device 105 (e.g., a server computer) configured with a distributed workbook storage controller 110. For example, in one embodiment, the distributed workbook storage controller 110 is part of a larger computer application (e.g., a multi-dimensional database application), configured to provide distributed workbook storage across multiple distributed storage locations of a multi-dimensional database system. The embodiments described herein take into consideration the balancing of both loading and usage of resources.

The distributed workbook storage controller 110 is configured to computerize the process of storing workbooks in a distributed manner across multiple distributed mount points. In one embodiment, the system 100 is a computing/data processing system including an application or collection of distributed applications for enterprise organizations. The applications and computing system 100 may be configured to operate with or be implemented as a cloud-based networking system, a software-as-a-service (SaaS) architecture, or other type of computing solution.

In one embodiment, a computer algorithm is disclosed that implements a round robin approach for distributing workbooks. In another embodiment, established priorities associated with the distributed storage locations are taken into consideration as part of the round robin approach. It is assumed herein that the system 100 is a multi-dimensional database system capable of having extra mounts points operably connected thereto, forming a set of distributed storage locations for workbooks. By distributing workbooks of a multi-dimensional database system in a manner that balances load and usage, multiple operations referencing a user's directory, which can lead to contentions or cause disk out-of-space issues, can be minimized if not totally avoided.

With reference to FIG. 1, in one embodiment, the distributed workbook storage controller 110 is implemented on the computing device 105 and includes logics or modules for implementing various functional aspects of the distributed workbook storage controller 110. In one embodiment, the distributed workbook storage controller 110 includes visual user interface logic/module 120, selection logic/module 130, comparison logic/module 140, and directory structure creation logic/module 150.

Other embodiments may provide different logics or combinations of logics that provide the same or similar functionality as the distributed workbook storage controller 110 of FIG. 1. In one embodiment, the distributed workbook storage controller 110 is an executable application including algorithms and/or program modules configured to perform the functions of the logics. The application is stored in a non-transitory computer storage medium. That is, in one embodiment, the logics of the distributed workbook storage controller 110 are implemented as modules of instructions stored on a computer-readable medium.

The computer system 100 also includes a display screen 160 operably connected to the computing device 105. In accordance with one embodiment, the display screen 160 is implemented to display views of and facilitate user interaction with a graphical user interface (GUI) generated by visual user interface logic 120 for viewing and updating information associated with creating and storing workbooks. The graphical user interface may be associated with a distributed workbook storage application and visual user interface logic 120 may be configured to generate the graphical user interface.

In one embodiment, the multi-dimensional database system 100 is a centralized server-side application that provides at least the functions disclosed herein and that is accessed by many users via computing devices/terminals communicating with the system 100 (functioning as the server) over a computer network. Thus the display screen 160 may represent multiple computing devices/terminals that allow users to access and receive services from the distributed workbook storage controller 110 via networked computer communications.

In one embodiment, the multi-dimensional database system 100 further includes persistent multi-dimensional data cache 170. The data cache 170 is made up of multiple distributed storage locations or file system mount points operably connected to the computing device 105 and/or a network interface to access the data cache 170 via a network connection. In one embodiment, each distributed storage location corresponds to a file system mount point of the multi-dimensional database system 100 being used as a root file system. In accordance with one embodiment, the data cache 170 is configured to store workbooks associated with the multi-dimensional database system 100 in a distributed manner. Distributed workbook storage controller 110 performs the functions for distributing workbooks in a balanced manner.

Referring back to the logics of the distributed workbook storage controller 110 of FIG. 1, in one embodiment, visual user interface logic 120 is configured to generate a graphical user interface (GUI) to facilitate user interaction with the distributed workbook storage controller 110. For example, visual user interface logic 120 includes program code that generates and causes the graphical user interface to be displayed based on an implemented graphical design of the interface. In response to user actions and selections via the GUI, associated aspects of generating and distributing workbooks may be manipulated.

For example, in one embodiment, visual user interface logic 120 is configured to facilitate checking out (e.g., creating), manipulating, and checking in (e.g., committing) a workbook in response to user actions. Furthermore, visual user interface logic 120 may facilitate the saving of workbook data associated with a workbook to a selected distributed storage location in accordance with a workbook directory structure. Also, visual user interface logic 120 may facilitate adding a new distributed storage location to the persistent multi-dimensional data cache 170, or removing a current distributed storage location from the persistent multi-dimensional data cache 170.

Referring again to FIG. 1, in one embodiment, selection logic 130 is configured to select a distributed storage location for a workbook. The distributed storage location is selected from multiple distributed storage locations of the persistent multi-dimensional data cache based on a round robin selection process. In the round robin selection process, the multiple distributed storage locations are selected in an order that promotes a balanced loading and a balanced usage of multiple workbooks stored across the multiple distributed storage locations.

In another embodiment, a prioritization process is combined with the round robin selection process to distribute workbooks. Each distributed storage location may be assigned a priority weighting. A priority weighting defines how frequently a distributed storage location should be selected to store a workbook. For example, a distributed storage location assigned a priority weighting of two (2) will be selected during the round robin process to store workbooks twice as often as another distributed storage location that is assigned a priority weighting of one (1).

Referring again to FIG. 1, in one embodiment, comparison logic 140 is configured to compare a current utilization level of a selected distributed storage location to a specified maximum usage level of the selected distributed storage location. Comparison logic 140 is also configured to update an information data structure, associated with a workbook to be stored in the selected distributed storage location, with identification data of the selected distributed storage location when the current utilization level is below the specified maximum usage level. In this way, a workbook is associated with a distributed storage location. As an example, a specified maximum usage level may be 95% and the current usage level may be 65% for a selected distributed storage location. The maximum usage level of 95% allows a 5% buffer or pad to guarantee that a next workbook that is stored to the selected distributed storage location will not be too large to be stored.

In another equivalent embodiment, comparison logic 140 may first consider the current utilization levels of all of the distribute storage locations. The round robin selection process may then be performed with respect to only those distributed storage locations having a current utilization level that is below the specified maximum usage level. Other equivalent embodiments may be possible as well.

Referring again to FIG. 1, in one embodiment, directory structure creation logic 150 is configured to create a workbook directory structure for a workbook within a selected distributed storage location. The workbook directory structure reflects a same directory structure provided by a common global domain of the multi-dimensional database system, up to a root directory of the selected distributed storage location. The global domain includes one master domain and a set of local domains. The root directory of the local domains may be under the root directory of the master domain. However, this can be changed by configuring. Additional details of creating a workbook directory structure are discussed herein with respect to at least FIG. 3 and FIG. 4.

The persistent multi-dimensional data cache 170 may store many workbooks across the multiple distributed storage locations. As discussed previously herein, a new distributed storage location may be added to the persistent multi-dimensional data cache 170, or a current distributed storage location may be removed from the persistent multi-dimensional data cache 170 (e.g., by a user as facilitated by visual user interface logic 120). Such adding or removing effectively forms a modified set of distributed storage locations and can disrupt the balance of the workbooks within the persistent multi-dimensional data cache.

When a distributed storage location is added or removed, it may be desirable to re-distribute the multiple stored workbooks across the modified set of distributed storage locations. In one embodiment, selection logic 130 and directory structure creation logic 150 are configured to re-distribute the multiple workbooks across the modified set of distributed storage locations when a distributed storage location is added to or removed from the persistent multi-dimensional data cache. Again, the round robin process (possibly along with the prioritization process) is used to re-distribute the workbooks. In this way, load balancing and usage balancing is re-established.

In this manner, the distributed workbook storage controller 110 controls the distribution of workbooks throughout the persistent multi-dimensional data cache of a multi-dimensional database system. Extra mount points may be "plugged into" the data cache as distributed storage locations. The distributed workbook storage controller 110 ensures that, as new workbooks are created, the new workbooks are distributed in such a way as to minimize, if not totally avoid, contentions or disk out-of-space issues caused by multiple operations referencing a user's directory.

Figure 2:
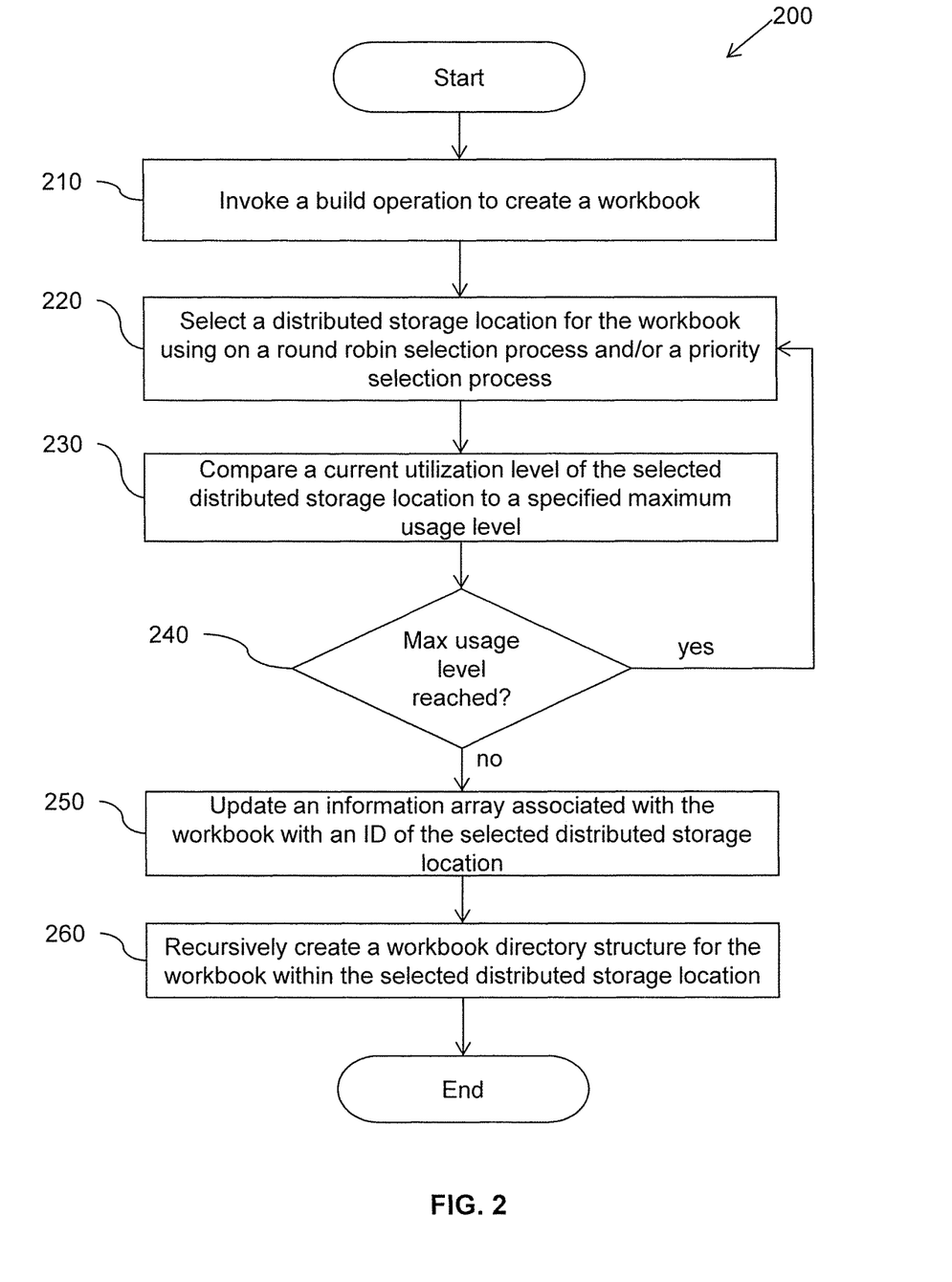
FIG. 2 illustrates one embodiment of a method, which can be performed by the distributed workbook storage controller of the multi-dimensional database system of FIG. 1, for intelligently distributing workbooks across multiple file system mount points to balance usage and load.

FIG. 2 illustrates one embodiment of a method 200, which can be performed by the distributed workbook storage controller 110 of the multi-dimensional database system 100 of FIG. 1, for intelligently distributing workbooks across multiple file system mount points to balance usage and load. Method 200 describes operations of the distributed workbook storage controller 110 and is implemented to be performed by the distributed workbook storage controller 110 of FIG. 1, or by a computing device configured with an algorithm of the method 200. For example, in one embodiment, method 200 is implemented by a computing device configured to execute a computer application. The computer application is configured to process data in electronic form and includes stored executable instructions that perform the functions of method 200.

Method 200 will be described from the perspective of FIG. 1, where the distributed workbook storage controller 110 is part of the multi-dimensional database system 100 that stores workbooks in a persistent multi-dimensional data cache 170. Again, a workbook can be described as a local copy of the data of record in a domain that an end user can easily view and manipulate. A workbook can also be described as a personal repository which is a subset of a domain of persistent multi-dimensional data cache of a multi-dimensional database system.

A workbook exists in a multidimensional framework which is used to perform specific business functions such as, for example, generating sales forecasts and building merchandise financial plans. A workbook can contain data presented in the form of any number of multidimensional spreadsheets, called worksheets, as well as graphical charts and related reports.

Upon initiating method 200, at block 210, a build operation of a multi-dimensional database system is invoked to create a new workbook. For example, a user may check out the new workbook from a multi-dimensional database system into a user workspace (e.g., via user interaction with the graphical user interface of the visual user interface logic 120) to trigger the invoking of the build operation. The user workspace may exist as an integral part of the multi-dimensional database system 100 (e.g., as memory), or may exist in an external computer (e.g., a remote computing terminal 160).

Referring again to FIG. 2, at block 220, a distributed storage location is selected for the new workbook from multiple distributed storage locations of the data cache 170. In one embodiment, the selection is performed by selection logic 130. The selection is made based on a round robin selection process as previously described herein, in accordance with one embodiment. The round robin selection process promotes a balanced loading and a balanced usage of multiple workbooks stored across the multiple distributed storage locations. In accordance with another embodiment, a prioritization process is combined with the round robin selection process to distribute workbooks, as previously described herein.

At block 230, a current utilization level of the selected distributed storage location is compared to a specified maximum usage level. Each distributed storage location may have its own specified maximum usage level, in accordance with one embodiment. At block 240, a determination is made as to whether the maximum usage level is reached or exceeded by the current utilization level. When the maximum usage level is reached, then the method 200 reverts back to block 220 to select another distributed storage location.

When the maximum usage level is not reached, then at block 250, an information data structure (e.g., an information array) associated with the workbook is updated with identification data of the selected distributed storage location. In this way, a workbook is associated with a distributed storage location. In one embodiment, comparison logic 140 performs the comparing, determining, and updating of blocks 230, 240, and 250, respectively.

At block 260, a workbook directory structure is recursively created for the new workbook within the selected distributed storage location. The workbook directory structure reflects a same directory structure provided by a common global domain of the multi-dimensional database system 100, up to a root directory of the selected distributed storage location.

In one embodiment, the workbook directory structure is created by directory structure creation logic 150. A user may enter workbook data into a user workspace to which the workbook is checked out via, for example, visual user interface logic 120. Once the workbook directory structure for a new workbook is created, the workbook data associated with the workbook can be saved to the selected distributed storage location in accordance with the workbook directory structure. The workbook can then be checked in to the multi-dimensional database system 100. Again, additional details of creating a workbook directory structure are discussed herein with respect to at least FIG. 3 and FIG. 4.

In this manner, the directory structure for, for example, a file system mount point (distributed storage location) recently added to the persistent multi-dimensional data cache 170 is the same as the directory structure under the common global domain across all mount points. As a result, the amount of coding and configuring that has to be performed to add a mount point to the multi-dimensional database system 100 is minimal and consistent across all mount points. This provides for the efficient scaling of the persistent multi-dimensional data cache 170 by a database administrator.

Again, the persistent multi-dimensional data cache 170 may store many workbooks across the multiple distributed storage locations. As discussed previously herein, a new distributed storage location may be added to the persistent multi-dimensional data cache 170, or a current distributed storage location may be removed from the persistent multi-dimensional data cache 170 (e.g., by a user as facilitated by visual user interface logic 120). Such adding or removing effectively forms a modified set of distributed storage locations and can disrupt the balance of the workbooks within the persistent multi-dimensional data cache.

Again, when a distributed storage location is added or removed, it may be desirable to re-distribute the multiple stored workbooks across the modified set of distributed storage locations. In one embodiment, selection logic 130 and directory structure creation logic 150 are configured to re-distribute the multiple workbooks across the modified set of distributed storage locations when a distributed storage location is added to or removed from the persistent multi-dimensional data cache. Again, the round robin process (possibly along with the prioritization process) is used to re-distribute the workbooks. In this way, load balancing and usage balancing is re-established.

As part of the deployment information managed by configuration tools of the multi-dimensional database system 100, one embodiment employs a distributed workbook configuration file "distwbconfig.xml". The distributed workbook configuration file contains the complete information for the distributed workbook storage, including a root directory and various parameters. The format of the distributed workbook configuration file conforms to other similar configurations of the multi-dimensional database system 100.

Figure 3:
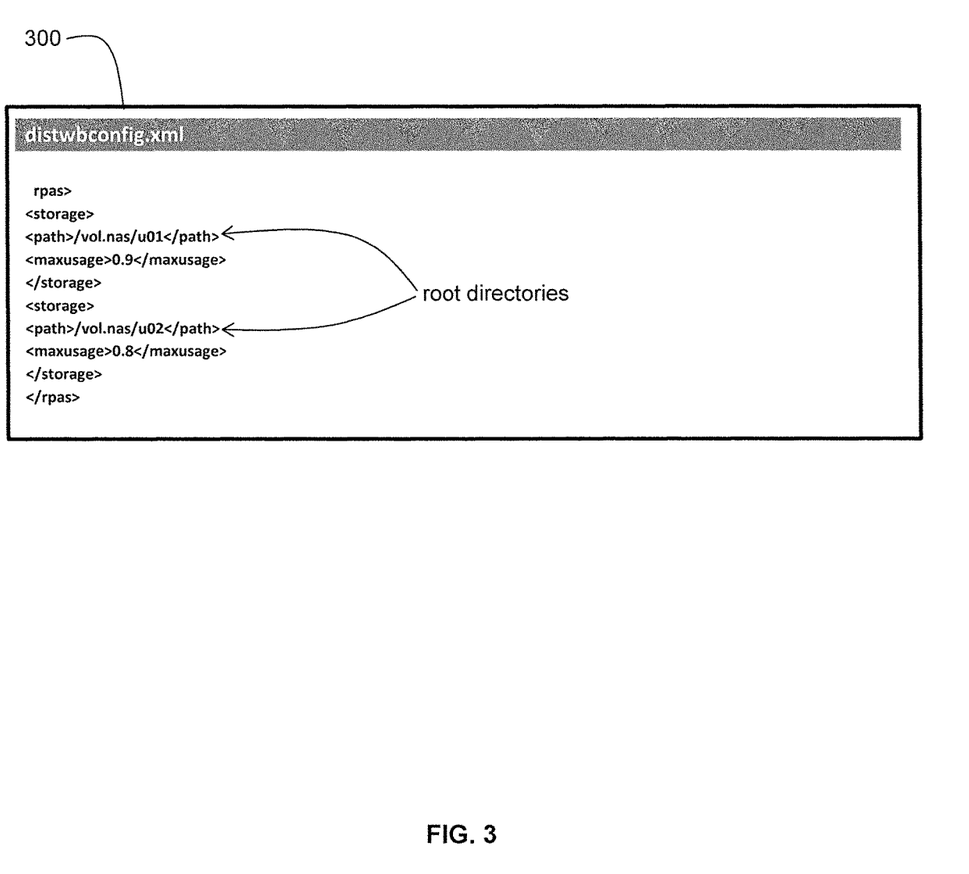
FIG. 3 illustrates an example embodiment of a configuration file containing the complete information for defining an example distributed workbook storage configuration.

FIG. 3 illustrates an example embodiment of a distributed workbook configuration file 300 containing the complete information for defining an example distributed workbook storage configuration. In the distributed workbook configuration file shown in FIG. 3, the top node of <rpas> is used to conform to other database configuration files. Within the <rpas> tag, the <storage> tag is used to specify the settings of each storage location. There can be multiple entries for <storage> within the <rpas> tag.

Within each <storage> tag, there is a <path> tag and a <maxusage> tag. The <path> tag specifies the root directory of a distributed storage location. This root directory exists such that the database system 100 does not consider the configuration to be invalid and throws an exception when it parses this file. However it is not necessary for the directory to be empty at the domain creation time since the distributed storage location can be shared by multiple database system domains.

Usually the directory specifies the path that is outside the root of the global domain, where the extra storage is mounted. If the database system administrator also wants to save workbooks under the primary domain, a <storage> tag is to be added where the parent directory of the domain is specified in the <path>.

In one embodiment, the <maxusage> tag specifies a percentage as the max usage level for the storage. If the workbook size stored in this storage grows over the max usage level, the database system 100 does not allow new workbooks to be allocated to this storage to prevent a possible disk full failure. The level is represented as a percentage of the total volume of the storage. When specifying the safe level, it should be kept in mind that the workbook usually doubles in size when opened due to the checkpoint directories. As a result, extra room should be allowed in the max usage level so that the distributed storage location is buffered against workbook open action as well. The actual percentage will also depend on the typical workbook size of the application and the total storage capacity. For example, if the typical workbook size is small while the storage device is large, the max usage level can be higher in percentage, and vice versa.

In the configuration file, the database system administrator can specify the root directory of the distributed storage, which is an existing directory when it is used by the database system. The database system manages the directory structure beneath the root directory such that it reflects the same directory structure as in a regular global domain, including a directory for a common master domain, all local domain directories under the common master domain, and users and user-id directories under each domain. Eventually the workbooks are stored within the user-id of the workbook owner. Other domain directories such as, for example, input, output, data, config, repos are not maintained in the distributed storage as these are not relevant to distributed storage.

The reasons for maintaining similar directory structures include:
    the distributed storage may be shared by multiple database system domains. The master domain is used as a direct sub-directory within the distributed storage root.
    database system workbook names are unique within a single domain, but not unique across domains. Therefore, two local domains may have workbooks with a same name, though they are completely different workbooks. As a result, the local domain path is put directly beneath the master domain directory.
    in a previous database system domain, the local domain storage may be partitioned using a global domain configuration file (globaldomainconfig.xml) such that each local domain may use a different storage location. However, for distributed storage, there is no need to further complicate the local domain directory. Therefore, local domain sub-directories are specified within a master domain located on the same directory level.

for other database system functionalities such as workbook copy, the database system assumes the workbook's parent directory is user-id and users of the domain. Therefore, to minimize code changes, the users/user-id directory also exists in the distributed storage directory structure.

Figure 4:
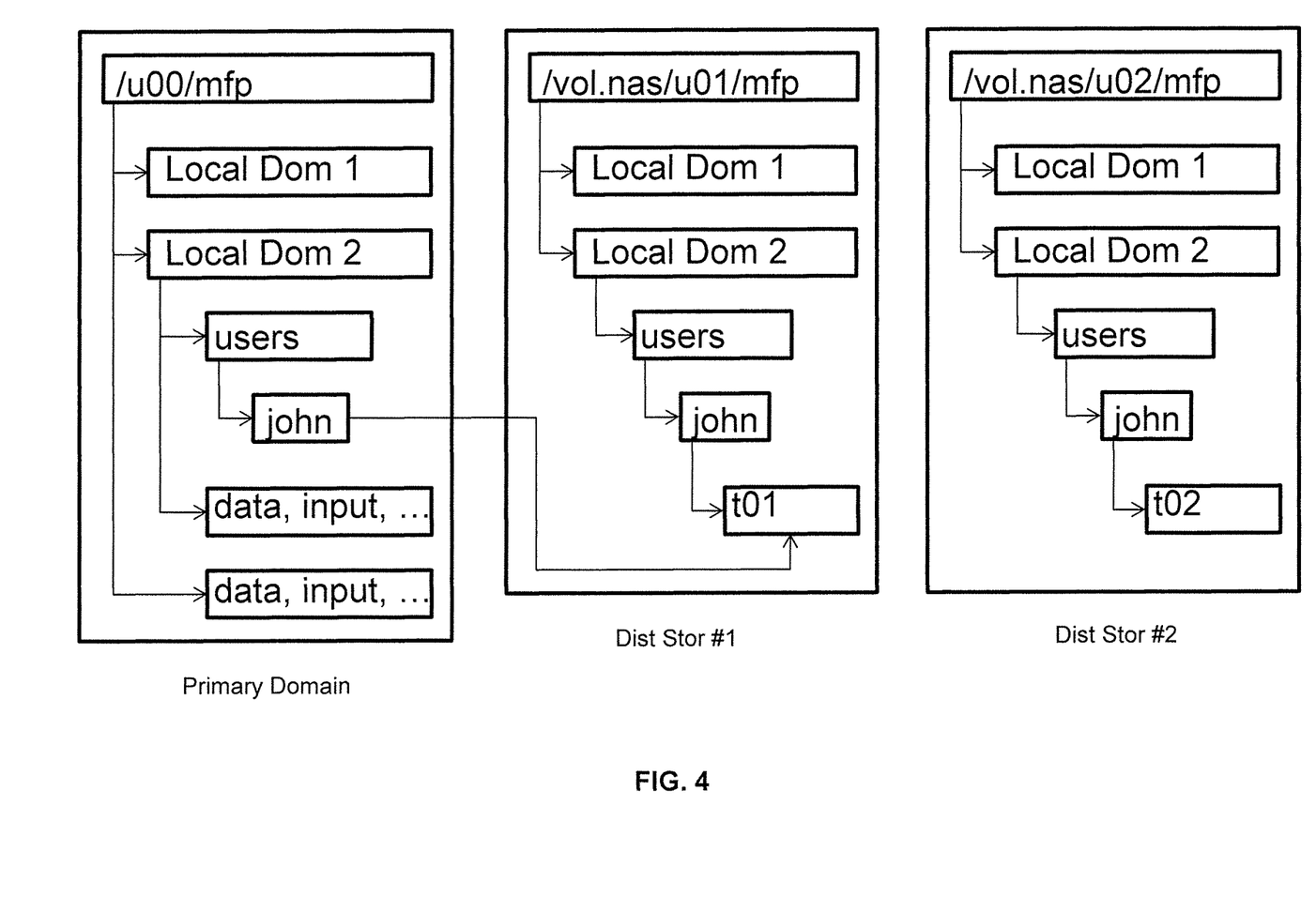
FIG. 4 graphically illustrates an example embodiment of the distributed workbook storage configuration defined by the configuration file of FIG. 3.

FIG. 4 graphically illustrates an example embodiment of the distributed workbook storage configuration defined by the configuration file of FIG. 3. In particular, FIG. 4 is an example of the directories of an mfprtl domain (Primary Domain in FIG. 4). The mfprtl domain has two distributed storage locations (Dist Stor #1 and Dist Stor #2 in FIG. 4) assigned to it, with user "john" having already built two workbooks in a local domain. The common master domain is designated by "mfp" and the mount points are designated by "u01", "u01", and "u02" in FIG. 4.

In one embodiment, the root directory exists at the time of configuration, and the database system automatically creates any sub-directories on demand when a new workbook is to be stored in the distributed storage. As a result, actions such as adding a new user, adding a new local domain, removing a user, and removing a local domain do not have impact on the directory structure of the distributed storage. When a user is removed from the domain, all workbooks belonging to this user are removed from the domain, and from the distributed storage. However, the user's directory may still stay in the distributed storage, though it is empty. When a new user is added to a domain, the user's directory is created in the domain, but not initially in the distributed storage. Only when the new user builds a new workbook (e.g., by invoking a build operation) is the user's directory created in the distributed storage.

Additional Details of One Embodiment

Distributed Workbook Configuration Array (distwbconfig):

In one embodiment, an array called "distwbconfig" is created in an area called meta.db of the master domain. The distwbconfig array is created by a domain creation function, updated by a patch process whenever the distributed workbook configuration file, distwbconfig.xml, is modified, and read accessed whenever a user creates a workbook. The distwbconfig array resides in meta.db because meta.db is a global resource in the sense that it may be accessed by all users from all domains. But meta.db may be accessed in read-only mode during a workbook build. Meta.db is mostly read-only for such a purpose. However, a data structure called wbdata.db is constantly opened for writing. Therefore, storing the distwbconfig array in meta.db causes much less contention than using wbdata.db.

The distwbconfig array has the same name as the configuration xml file and has two dimensions of info and storage. The info dimension has two positions: path and maxusage. These positions correspond to the two tags of the same name in the configuration file. The info:path stores the path to the root directory of the storage location. The info:maxusage stores the maxusage percentage for this storage location, which is optional and defaults to 90%, in accordance with one embodiment. The storage dimension simply keeps track of how many distributed storage locations have been assigned to the system. Below is an example:

info: path maxusage
s1 /vol.nas/u01 0.9
s2 /vol.nas/u02 0.8 where s1 and s2 are positions in the storage dimension, which are generated by the multi-dimensional database system automatically.

Workbook Info Array (wbdata.wbinfo):

One embodiment includes a workbook info array called wbdata.wbinfo. A position, "storage", is provided to the info dimension to save the storage ID of the workbook. The storage ID is the position name of the storage dimension of the distwbconfig array. When the storage ID is empty, the workbook is stored under the primary domain.

An example is given below for the two workbooks called "john" that were created in a previous example:

info: user grp storage . . .
t00001 adm admin s0
t00002 adm admin s1

Workbook Build Operation:

In one embodiment, a workbook build operation decides which storage location should be used to create the workbook, before the workbook is created. The operation performs a round robin selection from all available distributed workbook storage locations. The operation also takes into account the current utilization level of the selected storage location. The operation gathers all the configured storage paths, and then calls a system function to determine whether the utilization level of the selected storage location is above the max usage level specified for the selected storage location. If the selected storage location is overly filled, the multi-dimensional database system skips this storage location and moves to the next one. If all storage locations exceed the max usage level, which means all storage locations are nearly full, the database system throws an exception.

In one embodiment, with the list of the storage locations having utilization levels that are all below specified max usage levels, the database system performs a round robin selection of a storage location by using (domain id+workbook id) % (number of storage) as a selector. Domain id is 0 for the master domain and 1 to n for the local domains. Workbook id is the integer sequence number part within the workbook name tnnnnn.

Once a storage location has been selected for the workbook to be created, the database system updates the workbook info array with the storage ID. Then the database system creates the workbook directory structure recursively such that the structure is created all the way to the domain directory within the distributed storage root directory. Once the directory structure is created and the workbook info is updated correctly, functionality is returned back to the original execution path.

Workbook Open Operation:

In one embodiment, a Workbook Open operation first reads the actual workbook info to obtain the storage ID and construct an actual path to the workbook. The operation does not distinguish whether the actual workbook path is in distributed storage or is in the domain's primary directory. If the storage ID is empty, the primary domain is assumed.

Workbook Copy Operation

In one embodiment, a Workbook Copy operation is called by several other workbook operations: Copy, SaveAs, SaveAsap. The copy operation not only makes a new copy of the workbook, it also reassigns the owner of the copy to a current user. Therefore, if the original owner of the workbook is 'john' and user 'adm' makes a copy, the copy that 'adm' user made is stored under the users/adm directory, not the users/john directory.

When copying a workbook, the database system will copy the workbook within the same distributed storage location rather than trying to allocate the copy to a new storage location, unless the current storage location is full. The reason is for performance considerations. As long as the storage location is not constrained, copying files within the same storage location is much more efficient than copying them between different storage locations.

A Workbook SaveAs operation is implemented as a copy with a different name. A Workbook SaveAsap operation is implemented with a copy, but only copies a selection of the data rather than the complete workbook.

Workbook Move Operation:

Moving existing workbooks is performed when the database system administrator decides to decommission (remove) a storage location. As a result, all workbooks that have been stored in the storage location are to be moved to different locations. A Move Application Program Interface (API) first performs a cross storage copy of the workbook directory, updates the workbook info with the new storage ID, and finally removes the old workbook from the storage location.

Install Utility:

If the distwbconfig.xml file exists, during the domain creation, an Install utility copies the distwbconfig.xml file to the domain's configuration directory when it copies other deployment configuration files such as globaldomainconfig.xml. After the domain is fully created, the Install utility calls a workbook manager utility, wbMgr, with an updateStorage option, regardless of whether the distwbconfig.xml file exists or not. If the configuration file exists, this will cause the configuration to be loaded into the domain. If the configuration file does not exist, the wbMgr call gives the database system a chance to create the meta data array in the meta database, although it is empty. Pre-creating the array eliminates the need to create the array on demand at a later time.

There are two ways to specify the distributed workbook configuration file on an Install command line. If the -p argument is used for global domain partitioning, an optional argument, -dws configfile.xml, can be used. In this case, the file name can be arbitrary and the file can be copied to the config directory under the domain and renamed to distwbconfig.xml. If the -configdir argument is used for global domain partitioning, the same directory can contain an optional distwbconfig.xml file with that exact name. In this case, the -dws argument cannot be used. Invoking the wbMgr utility to update the storage configuration can be done in both -fullinstall and -patchinstall commands.

Copy Domain Utility (copyDomain):

A copyDomain utility can copy all workbooks, a subset of workbooks, or no workbooks. If it is called to copy at least some of the workbooks, it will copy the source workbook from the distributed workbook storage to the default workbook location, which is within the destination domain's users/userid directory. Therefore, as a result of the copyDomain utility, the workbooks in the destination domain are actually not distributed anymore, even though the supporting meta data for distributing workbook storage is copied.

Move Domain Utility (moveDomain):

The moveDomain utility provides the capability of moving a master domain or subdomain from one location to another. If the domain itself is a storage location, meaning that there are workbooks saved under that domain, the workbooks will be moved along with that domain. Workbooks saved to storage locations outside of the impacted domain(s) will not be moved.

Workbook Manager Utility (wbMgr):

The wbMgr utility can list workbooks, remove existing workbook names, print detailed information about each workbook, and provide enhancements that provide the functionalities below:

List all storage locations wbMgr -d. -listStorage

Prints detailed information about each distributed storage location in the database system, including its path and max usage level, and its current usage level.

Update storage configuration wbMgr -d. -updateStorage wbMgr re-reads the distwbconfig.xml file and compares its content with the current information stored in the meta.distwbconfig array. If any new distributed storage is added to the configuration file, the path and max usage level percentage are appended to the meta array. If any existing storage is removed from the configuration file, which means the database system administrator intends to decommission the storage, wbMgr handles the situation by moving all workbooks within the to-be removed storage to other storage locations, and then removes the entry from the meta.distwbconfig array.

Move workbooks from one storage location to another wbMgr -d. -move -wbList wb1, wb2, . . . -destStorage s1 wbMgr -d. -move -srcStorage s1 -destStorage s2

Move individual workbook(s) or all workbooks in one source storage location to a destination storage location.

List or print workbooks

Workbook listing (by -list or -print) includes information about the storage location.

In one embodiment, printing out the number of workbooks stored within each storage location, and which workbook is stored where, can be performed using the functionality of the -print operation, which prints out the actual workbook path.

Computing Device Embodiment

Figure 5:
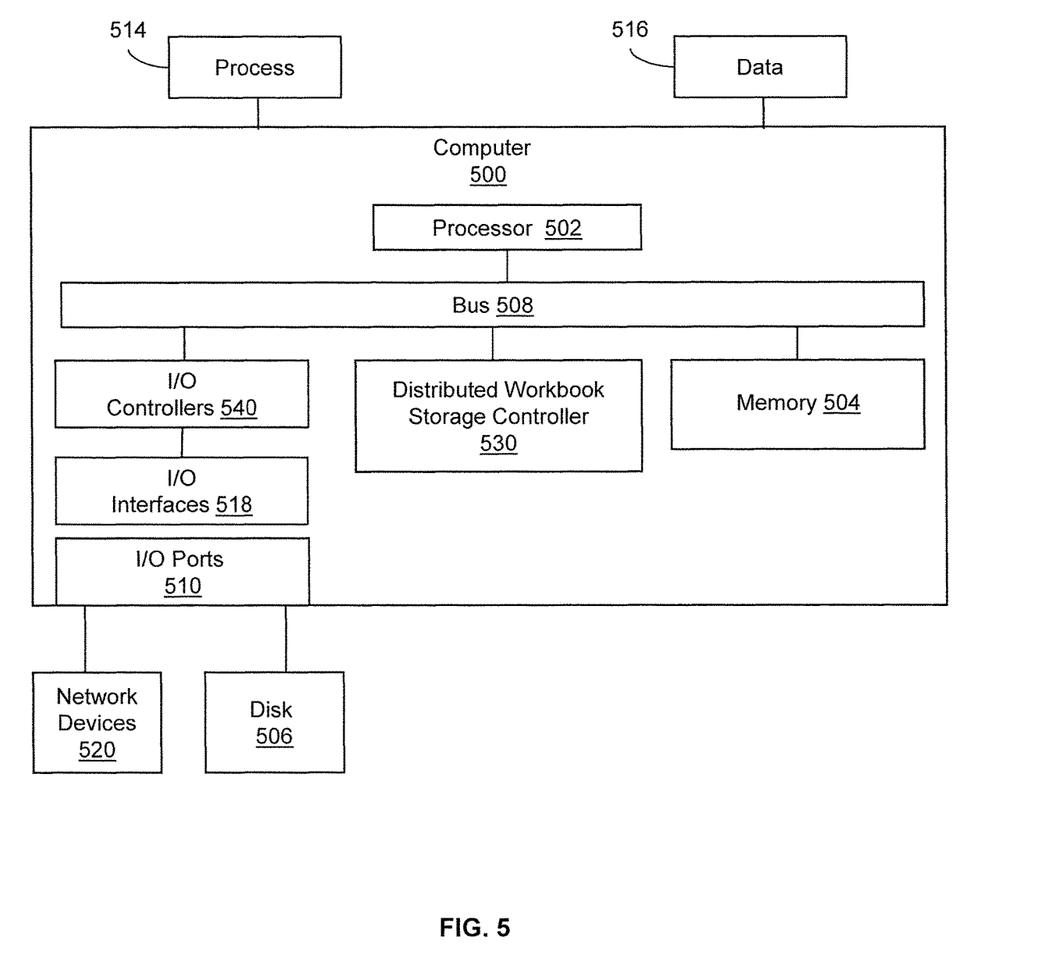
FIG. 5 illustrates one embodiment of a computing device upon which a distributed workbook storage controller of a computing system (e.g., a multi-dimensional database system) may be implemented.

FIG. 5 illustrates an example computing device that is configured and/or programmed with one or more of the example systems and methods described herein, and/or equivalents. FIG. 5 illustrates one example embodiment of a computing device upon which an embodiment of a distributed workbook storage controller may be implemented. The example computing device may be a computer 500 that includes a processor 502, a memory 504, and input/output ports 510 operably connected by a bus 508.

In one example, the computer 500 may include distributed workbook storage controller 530 (corresponding to distributed workbook storage controller 110 from FIG. 1) configured with a programmed algorithm as disclosed herein to distribute workbooks across multiple distributed storage locations to balance loading and usage. In different examples, the tool 530 may be implemented in hardware, a non-transitory computer-readable medium with stored instructions, firmware, and/or combinations thereof. While the tool 530 is illustrated as a hardware component attached to the bus 508, it is to be appreciated that in other embodiments, the tool 530 could be implemented in the processor 502, a module stored in memory 504, or a module stored in disk 506.

In one embodiment, tool 530 or the computer 500 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the distribution of workbooks. The means may also be implemented as stored computer executable instructions that are presented to computer 500 as data 516 that are temporarily stored in memory 504 and then executed by processor 502.

Tool 530 may also provide means (e.g., hardware, non-transitory computer-readable medium that stores executable instructions, firmware) for facilitating the distribution of multiple workbooks across multiple distributed storage locations to balance loading and usage of the distributed storage locations.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

Systems, methods, and other embodiments have been described that are configured to provide distributed workbook storage for a multi-dimensional database system. In one embodiment, a multi-dimensional database system includes a domain of persistent multi-dimensional data cache, including a plurality of distributed storage locations. The multi-dimensional database system also includes visual user interface logic configured to provide a graphical user interface to facilitate the checking out, manipulation, and checking in of a workbook of the multi-dimensional database system. The workbook includes a personal data repository which is a subset of the domain of persistent multi-dimensional data cache. The multi-dimensional database system further includes selection logic configured to select a distributed storage location, from the plurality of distributed storage locations, for the workbook based on a round robin selection process. The round robin selection process promotes a balanced loading and a balanced usage or a plurality of workbooks stored across the plurality of distributed storage locations. The multi-dimensional database system also includes directory structure creation logic configured to create a workbook director structure for the workbook within the selected distributed storage location. The workbook directory structure reflects a same directory structure provided by a common global domain of the multi-dimensional database system up to a root directory of the selected distributed storage location.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.

HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a computing device of a multi-dimensional database system, where the computing device includes at least a processor for executing instructions from a memory, the method comprising:

invoking a build operation of a multi-dimensional database system to create a workbook, wherein the workbook comprises a user data repository which is a subset of a domain of persistent multi-dimensional data cache of the multi-dimensional database system;

creating storage for the user data repository of the workbook in response to the build operation being invoked by selecting a distributed storage location, from a plurality of file system mount points, as a selected distributed storage location for the user data repository of the workbook based on a round robin selection process, wherein the round robin selection process promotes a balanced loading and a balanced usage of a plurality of user data repositories from a plurality of workbooks stored across the plurality of file system mount points by collecting information on each distributed storage location, determining whether a utilization level of the selected distributed storage location is above a maximum usage level specified for the selected distributed storage location, and upon determining that the selected distributed storage location is above a maximum usage level, selecting another distributed storage location, and wherein the selecting of the distributed storage location is further based on a priority weighting assigned to each storage location such that the priority weighting defines how frequently a distributed storage location should be selected to store the workbook; and creating a workbook directory structure for the user data repository of the workbook within the selected distributed storage location, wherein the workbook directory structure reflects a same directory structure provided by a common global domain of the multi-dimensional database system up to a root directory of the selected distributed storage location.

2. The method of claim 1, further comprising saving workbook data associated with the workbook to the selected distributed storage location in accordance with the workbook directory structure.

3. The method of claim 1, further comprising:

comparing a current utilization level of the selected distributed storage location to a specified maximum usage level of the selected distributed storage location; and updating an information data structure associated with the workbook with identification data of the selected distributed storage location when the current utilization level is below the specified maximum usage level.

4. The method of claim 1, further comprising checking out the workbook from the multi-dimensional database system into a user workspace to trigger the invoking of the build operation.

5. The method of claim 1, further comprising checking in the workbook to the multi-dimensional database system from a user workspace.

6. The method of claim 1, further comprising re-distributing the plurality of workbooks across the plurality of file system mount points when a new storage location is added to the plurality of file system mount points.

7. The method of claim 1, further comprising re-distributing the plurality of workbooks across the plurality of file system mount points when a current distributed storage location is removed from the plurality of file system mount points.

8. The method of claim 1, wherein each distributed storage location corresponds to a file system mount point of the multi-dimensional database system being used as a root file system.

9. The method of claim 1, wherein the workbook directory structure is created recursively.

10. A multi-dimensional database system, comprising:

a domain of persistent multi-dimensional data cache including a plurality of distributed storage locations;

a visual user interface module, including instructions stored in a non-transitory computer-readable medium, configured to provide a graphical user interface to facilitate checking out, manipulation, and checking in of a workbook of the multi-dimensional database system, wherein the workbook comprises a user data repository which is a subset of the domain of persistent multi-dimensional data cache;

a selection module, including instructions stored in the non-transitory computer-readable medium, configured to create storage for the user data repository of the workbook in response to the build operation being invoked by selecting a distributed storage location, from the plurality of file system mount points, as a selected distributed storage location for user data repository of the workbook based on a round robin selection process, wherein the round robin selection process promotes a balanced loading and a balanced usage of a plurality of user data repositories from a plurality of workbooks stored across the plurality of file system mount points by collecting information on each distributed storage location, determining whether a utilization level of the selected distributed storage location is above a maximum usage level specified for the selected distributed storage location, and upon determining that the selected distributed storage location is above a maximum usage level, selecting another distributed storage location, and wherein the selection module is further configured to select the distributed storage location based on a priority weighting assigned to each storage location such that the priority weighting defines how frequently a distributed storage location should be selected to store the workbook; and a directory structure creation module, including instructions stored in the non-transitory computer-readable medium, configured to create a workbook directory structure for the user data repository of the workbook within the selected distributed storage location, wherein the workbook directory structure reflects a same directory structure provided by a common global domain of the multi-dimensional database system up to a root directory of the selected distributed storage location.

11. The multi-dimensional database system of claim 10, wherein the visual user interface module is further configured to facilitate, via the graphical user interface, saving of workbook data associated with the workbook to the selected distributed storage location in accordance with the workbook directory structure.

12. The multi-dimensional database system of claim 10, further comprising a comparison module, including instructions stored in the non-transitory computer-readable medium, configured to:

compare a current utilization level of the selected distributed storage location to a specified maximum usage level of the selected distributed storage location; and update an information data structure associated with the workbook with identification data of the selected distributed storage location when the current utilization level is below the specified maximum usage level.

13. The multi-dimensional database system of claim 10, wherein the visual user interface module is further configured to facilitate, via the graphical user interface:
adding a new file system mount point to the plurality of file system mount points; and
removing a current file system mount point from the plurality of file system mount points.

14. The multi-dimensional database system of claim 10, wherein the selection module and the directory structure creation module are further configured to re-distribute the plurality of user data repositories from the plurality of workbooks across the plurality of file system mount points when an additional mount point is added to or removed from the plurality of file system mount points.

15. The multi-dimensional database system of claim 10, further comprising a display screen configured to display and facilitate user interaction with at least the graphical user interface.

16. A non-transitory computer-readable medium storing computer-executable instructions that, when executed by a computer, cause the computer to perform functions, wherein the instructions comprise:
instructions for invoking a build operation of a multi-dimensional database system to create a workbook, wherein the workbook comprises a user data repository which is a subset of a domain of persistent multi-dimensional data cache of the multi-dimensional database system;
instructions for creating storage for the user data repository of the workbook in response to the build operation being invoked by selecting a distributed storage location, from a plurality of file system mount points, as a selected distributed storage location for the user data repository of the workbook based on a round robin selection process, wherein the round robin selection process promotes a balanced loading and a balanced usage of a plurality of user data repositories from a plurality of workbooks stored across the plurality of file system mount points by collecting information on each distributed storage location, determining whether a utilization level of the selected distributed storage location is above a maximum usage level specified for the selected distributed storage location, and upon determining that the selected distributed storage location is above a maximum usage level, selecting another distributed storage location, and
wherein the selecting of the distributed storage location is further based on a priority weighting assigned to each storage location such that the priority weighting defines how frequently a distributed storage location should be selected to store the workbook; and
instructions for creating a workbook directory structure for the user data repository of the workbook within the selected distributed storage location, wherein the workbook directory structure reflects a same directory structure provided by a common global domain of the multi-dimensional database system up to a root directory of the selected distributed storage location.

17. The non-transitory computer-readable medium of claim 16, wherein the instructions further include instructions for:
comparing a current utilization level of the selected distributed storage location to a specified maximum usage level of the selected distributed storage location; and
updating an information data structure associated with the workbook with identification data of the selected distributed storage location when the current utilization level is below the specified maximum usage level.

18. The non-transitory computer-readable medium of claim 16, wherein the instructions further include instructions for re-distributing the plurality of workbooks across the plurality of file system mount points when a new storage location is added to or removed from the plurality of file system mount points.

* * * * *